United States Patent
Kim et al.

(10) Patent No.: US 11,300,118 B2
(45) Date of Patent: Apr. 12, 2022

(54) OPERATION CONTROLLING APPARATUS AND METHOD OF RECIPROCATING COMPRESSOR

(71) Applicant: LG Electronics Inc., Seoul (KR)

(72) Inventors: Jangsik Kim, Seoul (KR); Daeho Choi, Seoul (KR)

(73) Assignee: LG Electronics Inc., Seoul (KR)

(*) Notice: Subject to any disclaimer, the term of this patent is extended or adjusted under 35 U.S.C. 154(b) by 115 days.

(21) Appl. No.: 16/709,213

(22) Filed: Dec. 10, 2019

(65) Prior Publication Data

US 2021/0010468 A1    Jan. 14, 2021

(30) Foreign Application Priority Data

Jul. 11, 2019  (KR) .................... 10-2019-0084085

(51) Int. Cl.
*F04B 49/06* (2006.01)
*H02P 7/00* (2016.01)
(Continued)

(52) U.S. Cl.
CPC .............. *F04B 49/06* (2013.01); *F04B 49/20* (2013.01); *H02P 7/00* (2013.01);
(Continued)

(58) Field of Classification Search
CPC ........ F04B 49/06; F04B 49/20; F25B 49/022; H02P 7/00
See application file for complete search history.

(56) References Cited

U.S. PATENT DOCUMENTS

| 5,857,349 A | 1/1999 | Hamaoka et al. |
| 5,970,733 A | 10/1999 | Hamaoka et al. |

(Continued)

FOREIGN PATENT DOCUMENTS

| CN | 1420619 | 5/2003 |
| CN | 1599232 | 3/2005 |

(Continued)

OTHER PUBLICATIONS

Korean Notice of Allowance in Korean Appln. No. 10-2019-0084085, dated Jul. 10, 2020, 10 pages (with English translation).

(Continued)

*Primary Examiner* — Kawing Chan
*Assistant Examiner* — Bradley R Brown
(74) *Attorney, Agent, or Firm* — Fish & Richardson P.C.

(57) ABSTRACT

An operation controlling apparatus of a reciprocating compressor includes: a detector configured to detect a torque output by a motor of the reciprocating compressor, a rotation speed of the motor, a counter electromotive voltage of the motor, and a current applied to the motor; a controller configured to determine a mode switching time point for switching an operation mode of the reciprocating compressor based on the torque, the rotation speed, the counter electromotive voltage, and the current of the motor, and output a control signal for changing a wire ratio of the motor corresponding to the operation mode; and a driver configured to change the wire ratio of the motor based on the control signal and operate the reciprocating compressor in the operation mode among at least two operation modes.

19 Claims, 9 Drawing Sheets

(51) Int. Cl.
*F04B 49/20* (2006.01)
*F25B 31/02* (2006.01)
*F25B 49/02* (2006.01)

(52) U.S. Cl.
CPC .............. *F04B 2203/0201* (2013.01); *F04B 2203/0202* (2013.01); *F04B 2203/0209* (2013.01); *F05B 2270/1016* (2013.01); *F05B 2270/502* (2013.01); *F25B 31/023* (2013.01); *F25B 49/022* (2013.01); *F25B 2313/029* (2013.01); *F25B 2600/021* (2013.01); *F25B 2600/024* (2013.01)

(56) References Cited

U.S. PATENT DOCUMENTS

| | | | | |
|---|---|---|---|---|
| 6,014,004 A | * | 1/2000 | Hamaoka | H02P 6/20 318/778 |
| 2005/0062448 A1 | * | 3/2005 | Oh | H02P 21/18 318/268 |
| 2006/0153688 A1 | * | 7/2006 | Lee | F04B 35/045 417/44.1 |
| 2009/0252617 A1 | | 10/2009 | Mertens | |
| 2013/0195677 A1 | * | 8/2013 | Yoo | F25B 49/022 417/45 |

FOREIGN PATENT DOCUMENTS

| | | |
|---|---|---|
| CN | 101354024 | 1/2009 |
| CN | 103225601 | 7/2013 |
| CN | 104832411 | 8/2015 |
| JP | 2001275391 | 10/2001 |
| KR | 20020039067 | 5/2002 |
| KR | 10-0486596 | 5/2005 |
| KR | 20050055514 | 6/2005 |
| KR | 20060065903 | 6/2006 |
| KR | 10-1698100 | 1/2017 |

OTHER PUBLICATIONS

Office Action in Chinese Appln. No. 201910916049.4, dated Dec. 3, 2021, 12 pages (with English translation).

* cited by examiner

IN A SECTION IN WHICH CURRENT OF MOTOR HAS POSITIVE VALUE

IN A SECTION IN WHICH CURRENT OF MOTOR HAS NEGATIVE VALUE

OPERATION CONTROLLING APPARATUS AND METHOD OF RECIPROCATING COMPRESSOR

CROSS-REFERENCE TO RELATED APPLICATION

The present disclosure claims priority to and the benefit of Korean Patent Application No. 10-2019-0084085, filed on Jul. 11, 2019, the disclosure of which is incorporated herein by reference in its entirety.

TECHNICAL FIELD

The present disclosure relates to an operation controlling apparatus of a reciprocating compressor that operates based on changes in load and a method for controlling operation of the reciprocating compressor.

BACKGROUND

A reciprocating compressor may include a piston that linearly reciprocates in a cylinder where refrigerant gas is suctioned, compressed, and discharged. In some examples, the reciprocating compressor may be classified into a recipro-type reciprocating compressor and a linear-type reciprocating compressor according to a method of driving a piston.

The recipro-type reciprocating compressor may include a crankshaft coupled to a rotation motor and a piston coupled to the crankshaft to change a rotational force of the rotation motor to a linear reciprocation motion. The linear-type reciprocating compressor may include a piston directly connected to a mover of a linear motor to reciprocate the piston based on the linear motion of the motor.

The linear-type reciprocating compressor may not include a crankshaft that converts the rotational motion into the linear motion, which may decrease friction loss and improve compression efficiency of the linear-type reciprocating compressor.

In some cases, where refrigerators or air conditioners use reciprocating compressors, a freezing capacity, which may change a compression ratio of the reciprocating compressor, may be controlled by varying a voltage input to the reciprocating compressor.

FIG. 2 is a configuration diagram showing an example of a driver showing operation of the driver including an inverter in related art.

As shown in FIG. 2, a driver may include a full-bridge type inverter 30 including two groups of devices 31 and 32, a motor 50, and a switch 40 placed between the inverter 30 and the motor 50.

The full-bridge type inverter 30 may include two groups 31 and 32. The full-bridge type inverter 30 may include freewheel diodes D1 to D4 connected in parallel to four switching devices S1 to S4, respectively.

The inverter 30 may operate based on input of a control signal through pulse width modulation (PWM). That is, a first switching device S1 and a fourth switching device S4 may be turned-on and a second switching device S2 and a third switching device S3 may be turned-off so that a current flows through a compressor in a forward direction (a first group 31→a second group 32). Further, the first switching device S1 and the second switching device S4 may be turned on and the second switching device S2 and the third switching device S3 may be turned-on so that the current flows in a rearward direction (the second group 32→the first group 31).

The motor 50 may include a two-stage wind-separated motor including a first coil 51 and a second coil 52 connected in series.

Further, the switch 40 changes a current flow to the first coil 51 or the first coil 51 and the second coil 52 of the motor 50 based on the control signal of the controller 14 to switch the current flow flowing through the inverter 30. At this time, the switch may change the current flow into any one of a front end (a first end) (a) of the first coil 51 and an intermediate end (a second end) (b) to which the first coil 51 and the second coil 52 are connected.

In more detail, the switch 40 may change a current line connected to the first group 31 (a node provided between S1 and S4) of the inverter 30 to be connected to the first end a of the first coil 51, or may change the current line connected to the first group 31 (a node provided between S1 and S4) of the inverter 30 to be connected to the second end (b) to which the first coil 51 and the second coil 52 are connected. The current line connected to the second group 32 (the node provided between S2 and S3) of the inverter 30 may be connected to a rear end (a third end) (c) of the second coil 52.

Operation and operation of the above-described driver are as follows.

FIGS. 3A and 3B show diagrams of examples of a current waveform detected by a detector in related art.

Referring to FIGS. 3A and 3B, first, a compressor may be driven through a first coil 51 and a second coil 52. To this end, a switch 40 is short-circuited with a first end (a) based on the signal to control the output of the controller 14, and a power (AC) is supplied to the first coil 51 and the second coil 52, to drive a motor 50. This operation is referred to as "operation in a high efficiency mode" or a saving mode.

A controller recognizes that a current in a current section is in an overload state. As shown in FIG. 3A, in the above current section, a section in which a current is "0" (a current dead zone) (t1) is maintained for a predetermined period of time or less, among currents of a current detector 12 that detects a current applied to a motor 50. The controller 14 may output the converting signal to respond to the overload to the switch 40.

As a result, the switch 40 may switch the mode from "the high efficiency mode (the saving mode)" to "the overload response mode (the power mode)", that is, and may change the current flow from a first end (a) to a second end (b). Thus, the motor 50 uses both the first coil 51 and the second coil 52, and subsequently, the motor 50 uses only the second coil 52, so that the wire ratio of the motor 50 is reduced and the motor 50 operates by preventing voltage shortage. This operation is referred to as "operation in an overload response mode (a power mode)."

In the overload response mode (the power mode), the voltage may be controlled to avoid an undervoltage to thereby prevent the voltage shortage.

For example, as shown in FIG. 3B, the driver 11 maintains a section in which a current is "0" (a current dead zone) (t1) for a predetermined period of time or more so that the controller 14 may easily recognize the overload response mode (the power mode). As a result, a current applied to the motor may be provided to respond the overload through the above process.

However, other reciprocating compressors that use the driver including the inverter may further use a switch 40 to switch a mode to "the high efficiency mode (the saving mode)" or "the overload response mode (the power mode)," which incurs an additional cost. In particular, a relay element is mainly used as examples of the switch 40, which leads to a delay in the switching.

In some cases, only 2-stage operation mode may be used to control the operation of other reciprocating compressors that use the driver including the inverter. When two or more switches 40 are used to switch the mode, a large number of stages operation modes may be used. However, as the number of switches 40 is increased, the cost thereof is increased. In addition, an overall volume of the operation controlling apparatus may be increased due to the increase in the number of passive elements provided as the switch 40.

SUMMARY

The present disclosure provides an operation controlling apparatus of a reciprocating compressor and a method for controlling operation of the reciprocating compressor by which and through which a current applied to a linear motor is detected and a wire ratio thereof, when a section (a current dead zone) in which a current is "0" is maintained for a predetermined period of time or less, is changed, so that the operation controlling of the reciprocating compressor operates in response to load applied to a compressor.

The present disclosure also provides an operation controlling apparatus and a method for controlling operation of the reciprocating compressor by which and through which a switch is removed from a driver included in the operation controlling apparatus of the reciprocating compressor and the reciprocating compressor may operate in a three-group operation mode using a three-group inverter IPM.

The present disclosure also provides an operation controlling apparatus and a method for controlling operation of the reciprocating compressor by which and through which the reciprocating compressor including at least two-stage wire-separated motor of the driver has three-group or more of operation mode.

The present disclosure further provides an operation controlling apparatus of reciprocating compressor and a method for controlling operation of the reciprocating compressor, by which and through which the switch is removed from the driver included in the operation controlling apparatus of the reciprocating compressor and the operation controlling apparatus of the reciprocating compressor operates without hardware added to switch an operation mode.

The objects of the present disclosure are not limited to the above-mentioned objects, and other objects and advantages of the present disclosure which are not mentioned may be understood by the following description and more clearly understood by the implementations of the present disclosure. It will also be readily apparent that the objects and the advantages of the present disclosure may be implemented by means defined in claims and a combination thereof.

According to one aspect of the subject matter described in this application, an operation controlling apparatus of a reciprocating compressor configured to operate based on changes in load includes: a detector configured to detect a torque output by a motor of the reciprocating compressor, a rotation speed of the motor, a counter electromotive voltage of the motor, and a current applied to the motor; a controller configured to: determine a mode switching time point for switching an operation mode of the reciprocating compressor based on the torque, the rotation speed, the counter electromotive voltage, and the current of the motor, and output a control signal for changing a wire ratio of the motor corresponding to the operation mode; and a driver configured to change the wire ratio of the motor based on the control signal and operate the reciprocating compressor in the operation mode among at least two operation modes.

Implementations according to this aspect may include one or more of the following features. For example, the driver may include the motor and an inverter, the inverter including a full-bridge type inverter that may include three or more groups of devices, and the motor may include a wire-separated motor including two or more coils connected to each other electrically in series. In some examples, each of the groups of devices corresponds to one of the coils of the motor. In some examples, a number of the groups of devices may be greater than a number of the coils of the motor, and the driver further may include a switch configured to switch the operation mode based on the mode switching time point.

In some implementations, the inverter may include at least six full-bridge type switching devices and at least six free-wheel diodes, where each of the full-bridge type switching devices is connected to one of the free-wheel diodes electrically in parallel. In some examples, the full-bridge type switching devices may include at least one of an insulated gate bipolar transistor (IGBT), a metal-oxide-semiconductor field effect transistor (MOSFET), or a bipolar junction transistor (BJT). In some examples, the controller may be configured to selectively turn on or turns off each of the full-bridge type switching devices based on a phase width modulation (PWM) control with the control signal.

In some implementations, the coils of the motor may include a first coil and a second coil that are adjacent to each other, where the groups of devices may include: a first group connected to an end of the first coil by a first current line; a second group connected to an intermediate end between the first coil and the second coil by a second current line; and a third group connected to an end of the second coil by a third current line.

In some implementations, the controller may be configured to: control each of the full-bridge type switching devices to be turned on or turned off based on the control signal to thereby control current flow through the first coil, the second coil, or both; and switch the operation mode of the reciprocating compressor based on the current flow through the first coil, the second coil, or both. In some implementations, the two or more coils have wire ratios that are different from one another.

In some implementations, the operation mode of the reciprocating compressor may include a power saving mode corresponding to a first wire ratio, a power mode corresponding to a second wire ratio, and a normal mode corresponding to a third wire ratio, and the controller may be configured to change the wire ratio among the first wire ratio, the second wire ratio, and the third wire ratio based on the counter electromotive voltage of the motor. In some examples, the second wire ratio may be less than the first wire ratio, and the third wire ratio may be less than the first wire ratio and greater than the second wire ratio.

In some implementations, the controller may be configured to: in the power saving mode, control rotation of the motor based on the first wire ratio according to the counter electromotive voltage; in the power mode, control rotation of the motor based on the second wire ratio that is less than 50% of the first wire ratio; and in the normal mode, control rotation of the motor based on the third wire ratio that is between 50% of the first wire ratio and 100% of the first wire ratio.

In some implementations, a rotation speed of motor in the power mode may be greater than a rotation speed of the motor in the power saving mode, and a rotation speed of the motor in the normal mode may be less than the rotation speed of the motor in the power saving mode and greater than the rotation speed of the motor in the power mode. In some examples, the second wire ratio is reduced from the first wire ratio to rotate the motor with the rotation speed of the motor in the power mode.

In some implementations, the driver may be connected to a direct current (DC)-link and receive a DC-link voltage from the DC-link, where the counter electromotive voltage is proportional to the rotation speed of the motor corresponding to a number of turns of the motor. The counter electromotive voltage may have a speed limit voltage corresponding to a limit number of turns of the motor in each of the power saving mode, the power mode, and the normal mode, where the speed limit voltage is less than or equal to the DC-link voltage.

In some implementations, the controller may be configured to: in each of the power saving mode, the power mode, and the normal mode, detect (i) the limit number of turns of the motor based on a same torque and (ii) a time point at which the counter electromotive voltage and the current are changed; and determine the mode switching time point based on the time point at which the counter electromotive voltage and current are changed.

According to another aspect, a method for controlling a reciprocating compressor configured to operate based on changes in load includes: detecting torque output by a motor of the reciprocating compressor, a rotation speed of the motor, a counter electromotive voltage of the motor, and a current applied to the motor; determining a mode switching time point for switching an operation mode of the reciprocating compressor based on the torque, the rotation speed, the counter electromotive voltage, and the current of the motor; outputting a control signal for changing a wire ratio of the motor corresponding to the operation mode; and changing the wire ratio of the motor based on the control signal to thereby operate the reciprocating compressor in the operation mode among at least two operation modes.

Implementations according to this aspect may include one or more of the following features or the features described above. For examples, the operation mode may include a power saving mode corresponding to a first wire ratio, a power mode corresponding to a second wire ratio, and a normal mode corresponding to a third wire ratio, where changing the wire ratio may include changing the wire ratio among the first wire ratio, the second wire ratio, and the third wire ratio based on the counter electromotive voltage of the motor.

In some examples, the second wire ratio may be less than the first wire ratio, and the third wire ratio may be less than the first wire ratio and greater than the second wire ratio.

In some implementations, a current applied to the linear motor may be detected, and a wire ratio thereof may be changed, when a section in which a current is "0" (a current dead zone) is maintained for a predetermined period of time or less, and the operation controlling apparatus of the reciprocating compressor may operate in response to load applied to a compressor, by the operation controlling apparatus of the reciprocating compressor and through the method for controlling operation of the reciprocating compressor.

In some implementations, a switch (relay) may be removed using a three-group inverter device IPM and a mode to control the wire ratio thereof in consideration of the voltage shortage may be added by the operation controlling apparatus of the reciprocating compressor and through the method for controlling operation of the reciprocating compressor.

In some implementations, the three-group inverter IPM and a three-group control algorithm may be provided and an additionally mounted switch (relay) may be removed for two-stage operation of other reciprocating compressors.

In some implementations, the operation controlling apparatus of the reciprocating compressor and the method for controlling operation of the reciprocating compressor may use a three-stage operation mode of the reciprocating compressor, rather than a two-stage operation mode of the reciprocating compressor, thereby further subdividing operation control of the reciprocating compressor to be optimally controlled and improving efficiency of the reciprocating compressor.

In some implementations, the switch may be removed from the driver included in the operation controlling apparatus of the reciprocating compressor and the operation of the reciprocating compressor may be performed without hardware added to switch the operation mode, thereby reducing cost.

In some implementations, in the operation controlling apparatus of the reciprocating compressor and through the method for controlling the operation of the reciprocating compressor, the reciprocating compressor including the two-stage wire-separated motor may operate in the three-group operation mode using the three-group inverter IPM, thereby optimally subdividing the controlling of the operation of the reciprocating compressor.

A specific effect of the present disclosure, in addition to the above-mentioned effect, will be described together while describing a specific matter to implement the present disclosure.

DETAILED DESCRIPTION

Figure 1:
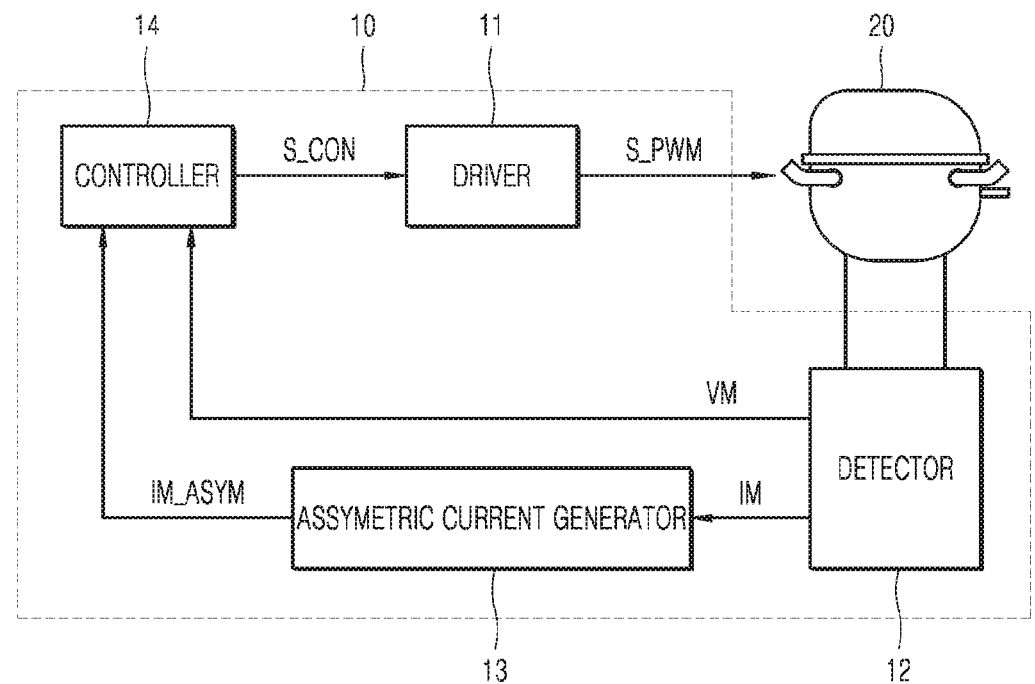
FIG. 1 is a configuration diagram showing an example of an operation controlling apparatus of a reciprocating compressor.

The above mentioned objects, features, and advantages of the present disclosure will be described in detail with reference to the accompanying drawings, so that those skilled in the art to which the present disclosure pertains may easily implement the technical idea of the present disclosure. In the description of the present disclosure, when it is determined that the detailed description of the known technology related to the present disclosure may obscure the gist of the present disclosure, the detailed description thereof will be omitted. Hereinafter, preferred implementations of the present disclosure will be described in detail with reference to the accompanying drawings. The same reference numeral is used to indicate the same or similar component in the figures.

FIG. 1 is a configuration diagram of an example of an operation controlling apparatus of a reciprocating compressor.

As shown in FIG. 1, an operation controlling apparatus 10 of the reciprocating compressor may include a driver 11 that drives a compressor 20 based on a control signal, a detector 12 that detects a current of a motor and/or a voltage of a motor of the compressor 20, an asymmetric current generator 13 that generates an asymmetric motor current using current offset for the detected current of the motor, and a controller 14 that generates the control signal to drive the compressor 20 based on the asymmetric current of the motor and/or the detected voltage of the motor.

In some examples, the driver 11 may generate a motor driving signal S_PWM based on a control signal S_CON applied from the controller 14, and may apply the motor driving signal S_PWM to a linear compressor 20 to drive the compressor 20. The motor driving signal S_PWM may have a form of alternating current (AC) voltage or an alternating current (AC).

In some cases, the driver 11 may include an inverter or a triac. In some cases, the driver 11 may include a motor having two or more coils.

Hereinafter, an operation controlling apparatus of a reciprocating compressor according to some implementations of the present disclosure is described.

Figure 4:
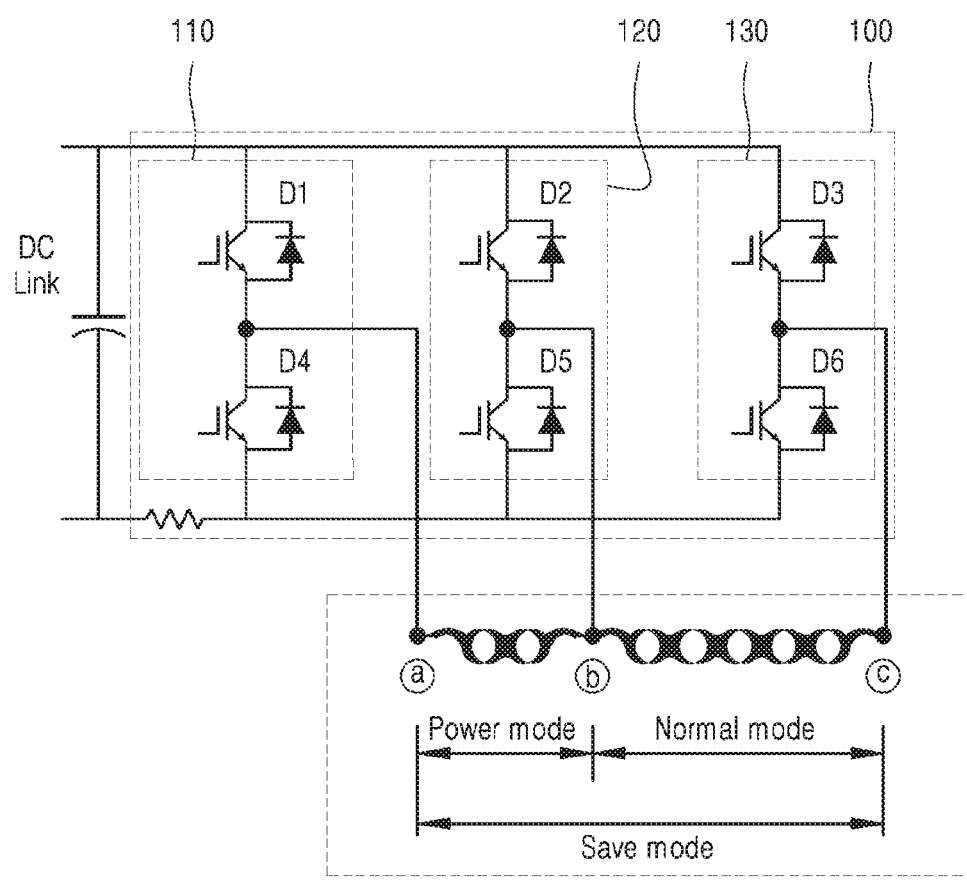
FIG. 4 is a configuration diagram showing an example of a driver including an inverter of a reciprocating compressor according to the present disclosure.

FIG. 4 illustrates a circuit configuration and an operation of an operation controlling apparatus of a reciprocating compressor including a driver. For example, as shown in FIG. 1, the operation controlling apparatus of the reciprocating compressor includes a driver 11, a detector 12, an asymmetric current generator 13, and a controller 14. However, the components of the operation controlling apparatus of the reciprocating compressor are not limited to the illustrated implementation, and some components may be added, changed, or deleted as necessary.

Referring to FIG. 4, a driver (e.g., the driver 11 in FIG. 1) may include a full-bridge type inverter 100 having three groups of devices 110, 120, and 130, and a motor 200 as shown in FIG. 4. Each group of devices may 110, 120, and 130 include two or more diodes and two or more switching devices.

In FIG. 4, the full-bridge type inverter 100 includes the three groups of devices 110, 120, and 130. However, the number of groups is not limited thereto, and the full-bridge type inverter may include three or more groups. For ease of explanation, the full-bridge type inverter 100 having three groups is described. In particular, the operation controlling apparatus of the reciprocation compressor may use the three-group inverter IPM, and the above case is described based on one implementation. However, this is one implementation for ease of explanation, but is not limited thereto.

In some implementations, the full-bridge type inverter 100 may include freewheel diodes D1 to D6 connected in parallel to six switching devices S1 to S6, respectively. Further, a first switching device S1 and a fourth switching device S4 are connected to each other in series to form a first group 110. Further, the second switching device S2 and the fifth switching device S5 are connected in series to each other to form a second group 120. Further, the third switching device S3 and the third switching device S3 are connected to each other in series to form a third group 130.

The switching devices S1 to S6 may be at least one of an insulated gate bipolar transistor (IGBT), a metal-oxide-semiconductor field effect transistor (MOSFET), or a bipolar junction transistor (BJT).

The inverter 100 may operate based on input of a control signal through the PWM applied from the controller 14. That is, the controller 14 selectively turns on or off the switching devices S1 to S6 to allow current to flow through the compressor 20 in the forward direction or the reverse direction. Detailed process thereof is described in detail below.

The motor 200 may include a two-stage wire-separated motor including a first coil 210 and a second coil 220 connected to each other electrically in series. However, the present disclosure is not limited thereto and may include a three-stage or more of wire-separated motor. The first coil 51 and the second coil 52 may have different wire ratios from each other.

A first current line may connect the first group 110 (the node provided between S1 and S4) of the inverter 100 to the front end (a first end) (a) of the first coil 210 of the motor 200. A second current line may connect the second group 120 (the node provided between S2 and S5) of the inverter 100 to an intermediate end (a second end) (b) to which the first coil 210 and the second coil 220 of the motor 200 are connected. A third current line may connect the third group 130 (the node provided between S3 and S6) of the inverter 100 to the rear end (a third end) (c) of the second coil 220.

In some implementations, the inverter 100 may include six switching devices S1 to S6 that have a full-bridge shape and that are controlled (turned on or turned off) based on a control signal of the controller 14. The reciprocating compressor may operate in the third-stage operation mode so that the current flow is changed to the first coil 210 or the second coil 220, or the first coil 210 and the second coil 220 of the motor 200.

The three-stage operation mode may be classified into a high efficiency mode (a power saving mode), a normal mode, and an overload response mode (the power mode).

The high efficiency mode (the power saving mode) is used in a section in which the motor 200 has a low rotation speed and the overload response mode (the power mode) is used when the motor 200 has high rotation speed. The normal mode is used in a section in which the motor 200 has an intermediate speed between the low speed and the high speed of the motor.

The operation mode is implemented by changing the wire ratio of the motor.

That is, in a section in which the counter electromotive voltage is low, the wire ratio thereof is changed to have a greater value in consideration of the counter electromotive force in the high efficiency mode (the power saving mode). Further, in a high speed section in which the counter electromotive voltage is high, the wire ratio thereof is changed to have a less value in consideration of the counter electromotive force in the overload response mode (the power mode). For example, in the overload response mode (the power mode), the wire ratio thereof less than 50% may be provided, compared to the high efficiency mode (the power saving mode), so that the controlling is performed to lower the counter electromotive force and to increase the current.

In some examples, the wire ratio of the motor in the normal mode may be changed to be greater than 50% and less than 100% of the wire ratio in the power saving mode. The wire ratio is not limited thereto and may be changed depending on the operation mode or the designer.

Thus, in the overload response mode (the power mode), the wire ratio thereof is reduced as much as the insufficient voltage to increase the current, to compensate for the voltage for high speed rotation, and to lower the counter electromotive voltage and prevent the voltage shortage.

To change the wire ratio thereof in each mode, the controller 14 controls (turns on or turns off) six full-bridge type switching devices (S1 to S6) to change the flow of current to flow through the first coil 210 or the second coil 220, or the first coil 210 and the second coil 220 of the motor 200.

That is, the controller 14 controls (turn-on or turn-off) the six full-bridge type switching devices S1 to S6 to control the operation of the reciprocating compressor in the high efficiency mode (the power saving mode), so that the flow of current flowing through the inverter 30 may be changed so that the current flows through the first coil 210 and the second coil 220 of the motor 200.

Further, the controller 14 may control the six full-bridge switching devices S1 to S6 to control the operation of the reciprocating compressor in the normal mode, so that the flow of current flowing through the inverter 300 may be changed to flow through the second coil 220 of the motor 200.

Further, the controller 14 may control the six full-bridge type switching devices (S1 to S6) to control the operation of the reciprocating compressor in the overload response mode (the power mode), so that the flow of the current flowing through the inverter 30 may be changed so that the current only flows through the first coil 210 of the motor 200.

The controller 14 may determine a time point at which the mode is switched based on the torque, rotation speed, counter electromotive voltage, and current of the motor detected by the detector 12, to detect a time point at which the operation of the reciprocating compressor is controlled in the high efficiency mode (the power saving mode), the normal mode, and the overload response mode (the power mode).

Figure 8:
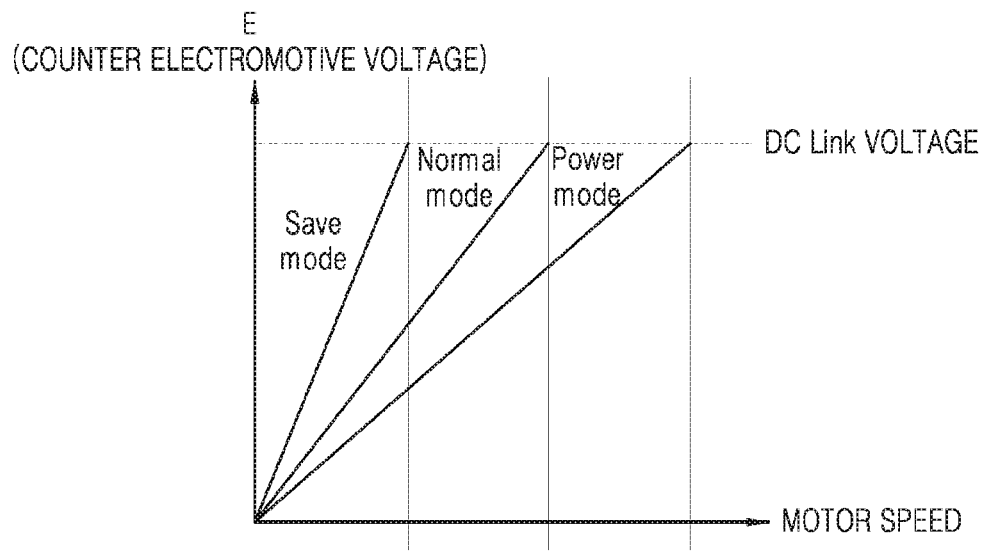
FIG. 8 is a graph showing an example of a rotation speed of a motor with respect to a counter electromotive voltage detected by a detector.
Figure 9:
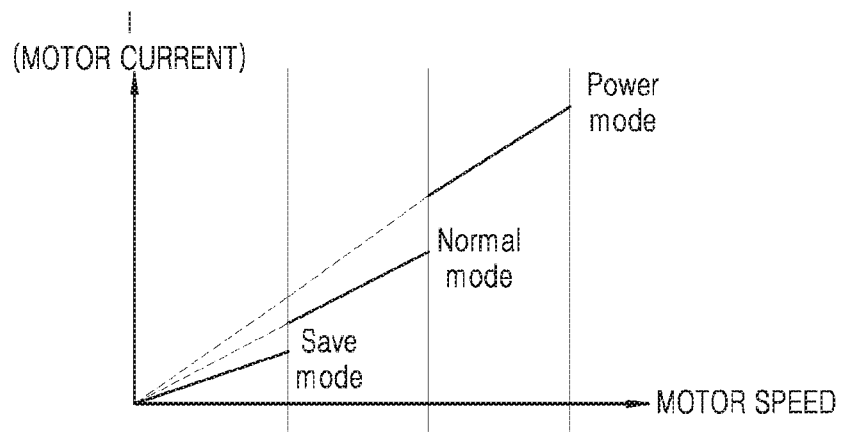
FIG. 9 is a view of an example of speed limit points with respect to the number of turns of a motor based on a same torque detected by a detector.

FIG. 8 shows an exemplary diagram corresponding to a graph showing a rotation speed of a motor with respect to a counter electromotive voltage detected by a detector. FIG. 9 is an exemplary diagram corresponding to a graph showing a limit point of speed with respect to changes of the number of turns of motor based on the same torque detected by a detector.

As shown in FIG. 8, the counter electromotive voltage E is proportional to the rotation speed of the motor and the number of turns of the motor. At this time, the limit point of the speed of the motor with respect to the number of turns of the motor in each mode may not be greater than a DC link voltage.

According to such a condition, as shown in FIG. 9, the limit point of the speed with respect to the changes in the number of turns of the motor based on the same torque, a time point in which the counter electromotive voltage and the current are changed may be detected in advance.

Accordingly, the controller 14 may determine the time point at which the mode is switched based on the time point at which the counter electromotive voltage and the current are changed.

The above-described operation and action of the driver for the operation control of the reciprocating compressor as described above is described below in detail.

Figure 5A:
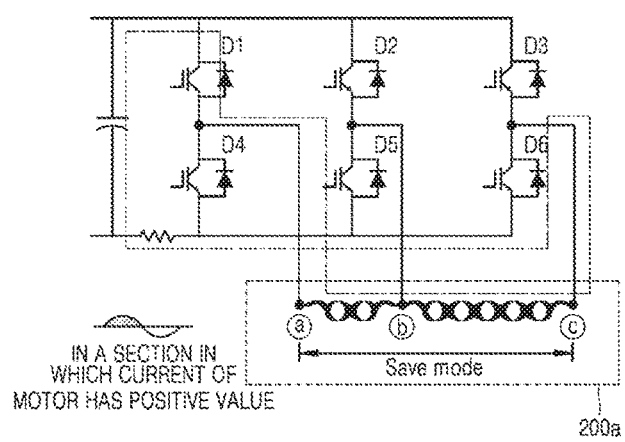
FIGS. 5A to 7B are exemplary views showing examples of operation modes performed by changing wire ratios by the driver to control operation of the reciprocating compressor in FIG. 4.
Figure 5B:
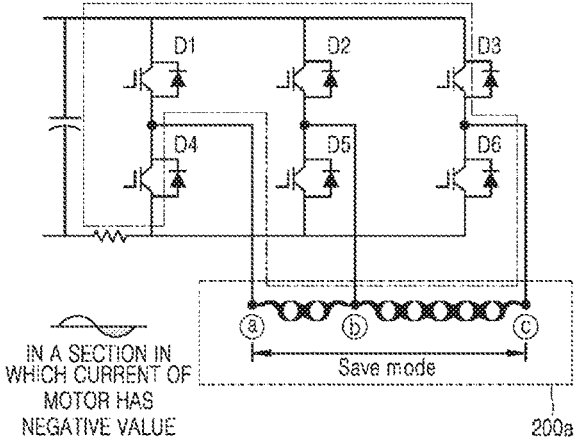
Figure 6A:
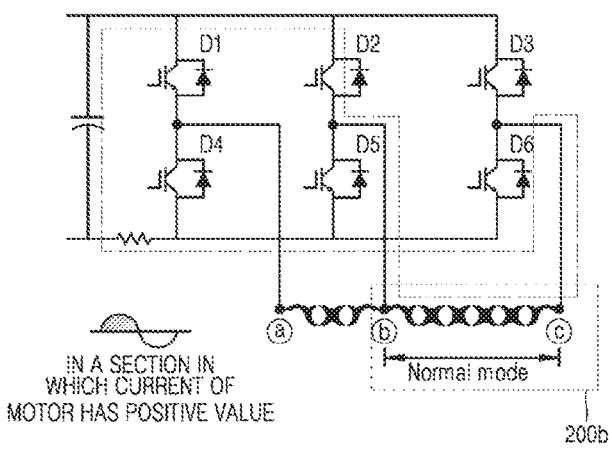
Figure 6B:
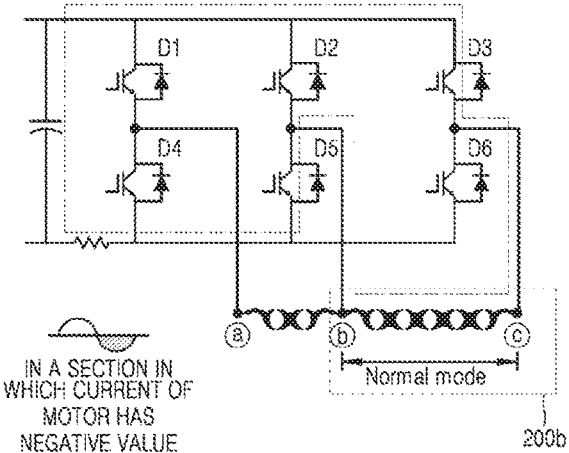
Figure 7A:
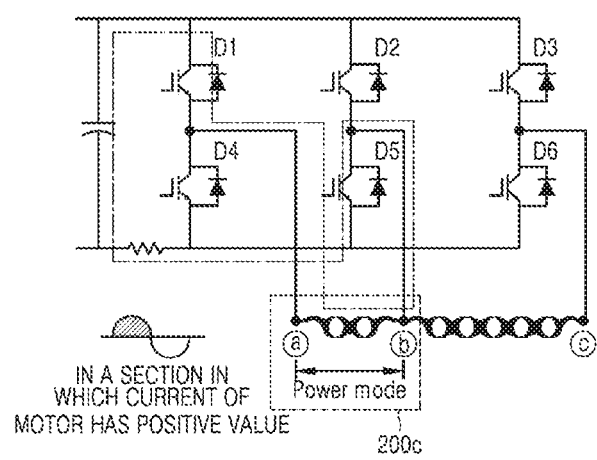
Figure 7B:
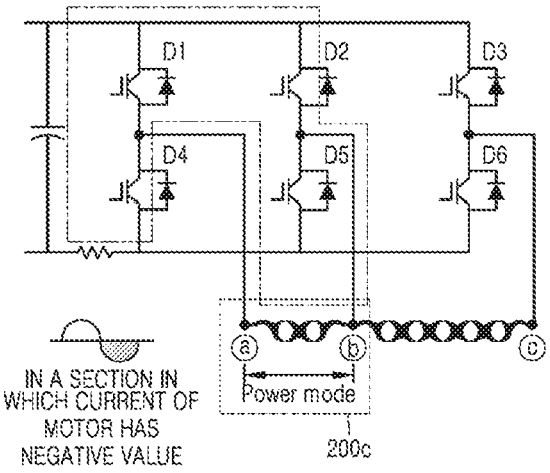

FIGS. 5A to 7B are exemplary diagrams showing operation modes performed by changing, by drivers, a wire ratio of a motor to control operation of the reciprocating compressor in FIG. 4. FIGS. 5A and 5B are exemplary diagrams showing examples of current flow when the reciprocating compressors operate in the high efficiency mode (the power saving mode). FIGS. 6A and 6B are exemplary diagrams showing examples of current flow when the reciprocating compressors operate in the normal mode. Further, FIGS. 7A and 7B are exemplar diagrams showing examples of current flow when the reciprocating compressors operate in the overload response mode (the power mode).

Referring to FIGS. 5A and 5B, in the high efficiency mode (the power saving mode), the six full-bridge switching devices S1 to S6 are controlled (turned on or turned off) so that the current flow is changed so that the current flowing through the inverter 100 flows through the first coil and the second coil 220*a*.

The inverter 100 may operate based on the input of the control signal through the PWM applied to the controller 14. Thus, the applied control signal has a section in which the control signal has a positive value and a section in which the control signal has a negative value.

In some examples, as shown in FIG. 5A, the current flows in the forward direction, in the section in which the control signal has the positive value, and the controller 14 turns on the first switching device S1 and the sixth switching device S6 and turns off the remaining switching devices S2 to S5 among six full-bridge type switching devices S1 to S6.

By contrast, as shown in FIG. 5B, the current flows in the reverse direction, in a section in which the control signal has negative value, and the controller 14 turns on the third switching device S3 and the fourth switching device S4 and turns off the remaining switching devices S1, S2, S5, and S6 among the six full-bridge type switching devices S1 to S6.

Through this switching, the driver 11 may change the current flow flowing through the inverter 100 so that the current flowing through the inverter 100 flows through the first coil and the second coil 200*a* of the motor 200.

As shown in FIGS. 6A and 6B, in the normal mode, the six full-bridge type switching devices S1 to S6 is controlled (turned on or turned off) based on the control signal of the controller 14, so that the current flow is changed so that the current only flows through the second coil 220*b* of the motor 200.

The inverter 100 may operate based on the input of the control signal through the PWM applied by the controller 14. Thus, the applied control signal has a section in which the control signal has a position value and a section in which the control signal has a negative value.

In some examples, as shown in FIG. 6A, when the control signal is in a section in which the control signal has the positive value, the current flows in the forward direction, and the controller 14 turns on the second switching device S2 and the sixth switching device S6 and turns off the remaining switching devices S1 and S3 to S5 among the six full-bridge type switching devices S1 to S6.

By contrast, as shown in FIG. 6B, the current flows in the reverse direction in a section in which the control signal has the negative value, the controller 14 turns on a third switching device S3 and a fifth switching device S5 and turns of the remaining switching devices S1, S2, S4, and S6 among six full-bridge type switching devices S1 to S6.

The driver 11 may change the current flow so that the current flowing through the inverter 100 flows through the second coil 200b.

As shown in FIGS. 7A and 7B, in the overload response mode (the power mode), six full-bridge type switching devices S1 to S6 are controlled (turned on or turned off) based on the control signal of the controller 14, so that the current that has flowed through the inverter 30 only flows through the first coil 200c of the motor 200.

At this time, the inverter 100 operates based on the input of the control signal through the PWM applied by the controller 14. Thus, the applied control signal has a section in which the control signal has a positive value and a section in which the control signal has a negative value.

In some examples, as shown in FIG. 7A, when the control signal is in a section in which the control signal has a positive value, the current flows in the forward direction, and the controller 14 turns on the first switching device and the fifth switching device S5 and turns off the remaining switching devices S2 to S4 and S6, among the six full-bridge type switching devices S1 to S6.

By contrast, as shown in FIG. 7B, the current flows in the reverse direction in a section in which the control signal has the negative value, the controller 14 turns on the second switching device S2 and the fourth switching device S4 and turns off the remaining switching devices S1, S3, S5, and S6, among six full-bridge type switching devices S1 to S6.

The driver 11 may change the current that has flowed through the inverter 100 to flow only into the first coil 210 of the motor 200 through switching.

Figure 10:
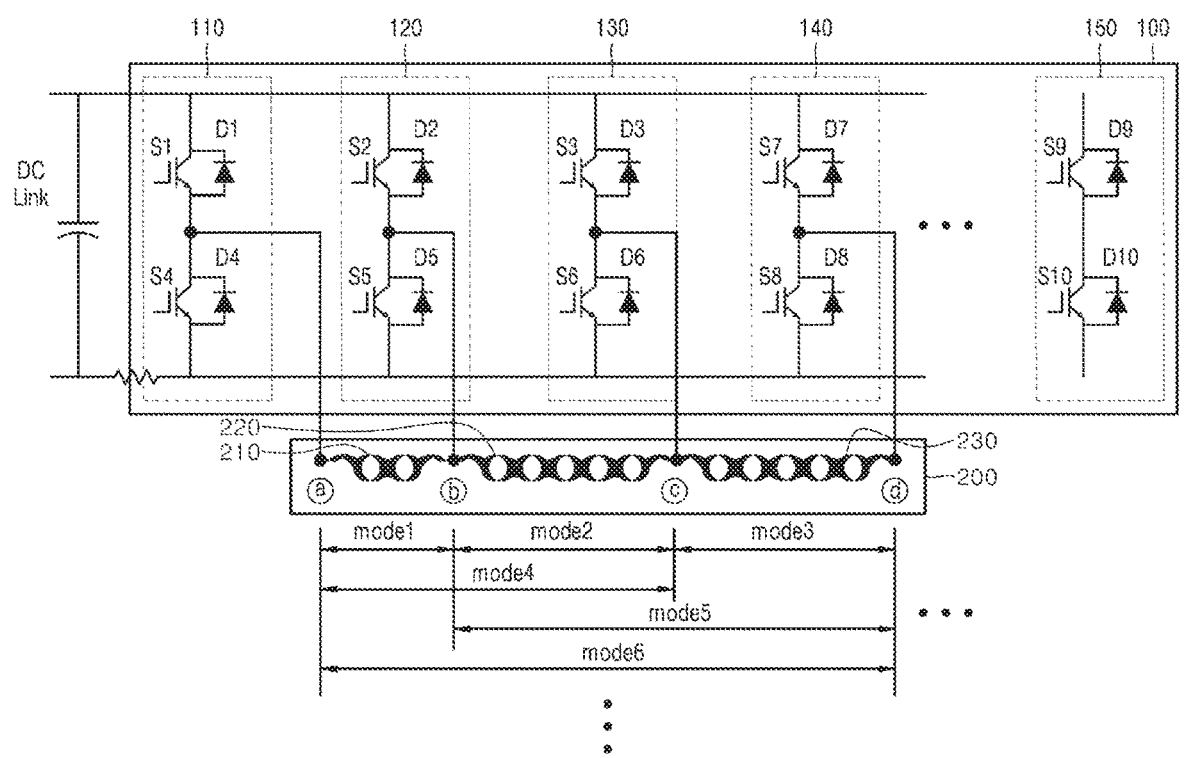
FIG. 10 is a view of an example driver including an inverter of an example operation controlling apparatus of a reciprocating compressor.

FIG. 10 is a configurational view of an example driver, showing operation of the driver including an inverter in an operation controlling apparatus of a reciprocating compressor.

FIG. 10 shows a driver 11 including a full-bridge type inverter 100 and a motor 200.

FIG. 10 is different from FIG. 4 in that FIG. 10 shows a full-bridge type inverter 100 including n-number of groups 110, 120, 130, 140, and 150 while FIG. 4 shows a full-bridge type inverter 100 including three groups 110, 120, and 130.

As shown in FIG. 4, the driver 11 includes a two-stage wire-separated motor 200 including the first coil 210 and the second coil 220 connected in series. As shown in FIG. 10, the driver 11 includes the three-stage wire-separated motor 200 including the first coil 210, the second coil 220, and the third coil 230. The number of coils including the three-stage wire-separated motor 200 is increased compared to the number of coils including the two-stage wire-separated motor 200.

In some implementations, as shown in FIG. 10, the number of groups of the inverter 100 and the number of coils of the motor 200 may be increased to four, five, or more.

In some implementations, the method for controlling operation of the inverter 100 in which the number of groups is increased and the motor 200 in which the number of coils is increased has the same or similar technical idea as or to the method for controlling the operation of the inverter 100 and the motor 200 shown in FIG. 4. Thus, details of the method for controlling the operation of the inverter 100 in which the number of groups is increased and the motor 200 in which the number of coils is increased are omitted.

Figure 2:
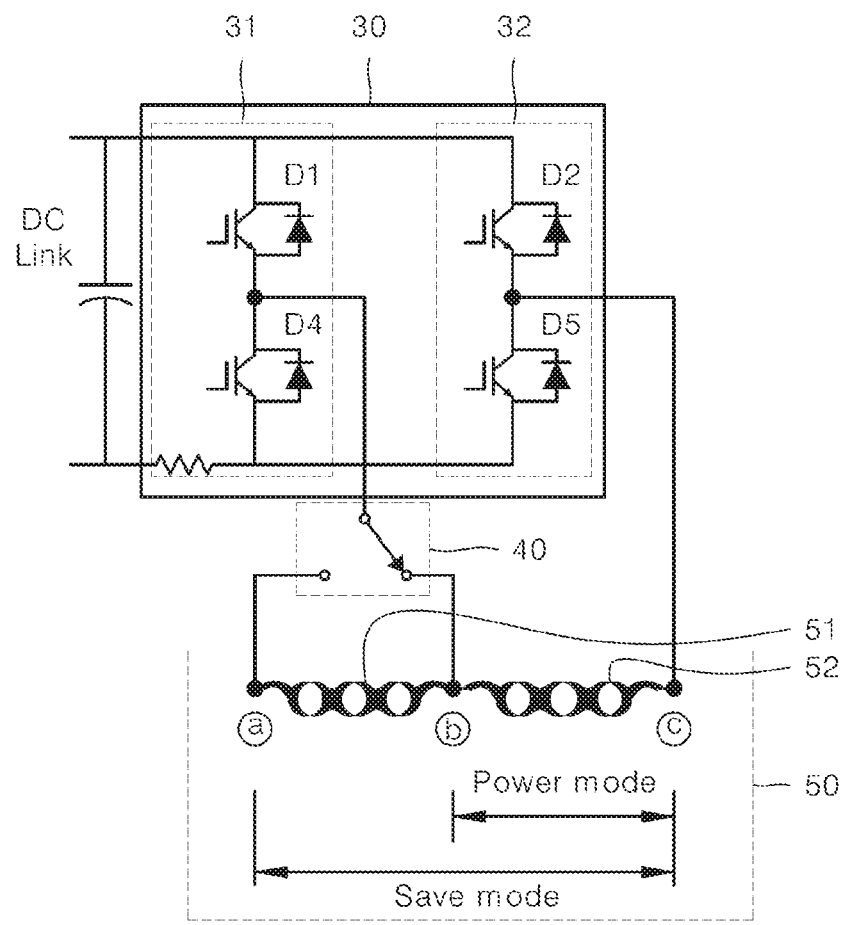
FIG. 2 is a configuration diagram showing a driver of an operation controlling apparatus in related art.
Figure 3A:
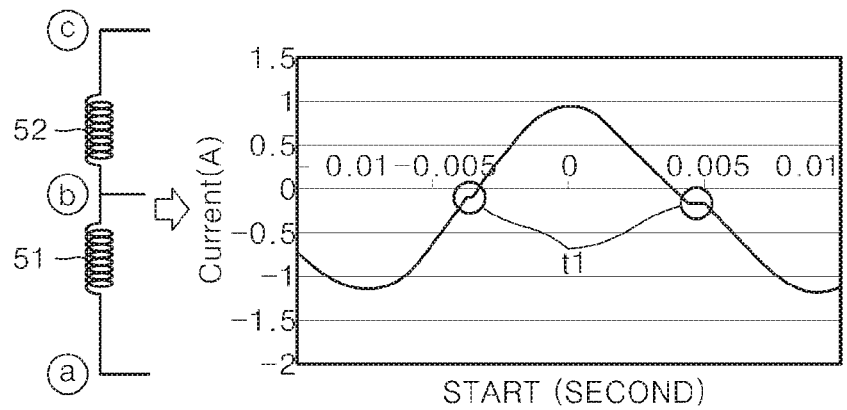
FIGS. 3A and 3B are exemplary views showing examples of a current waveform in related art.
Figure 3B:
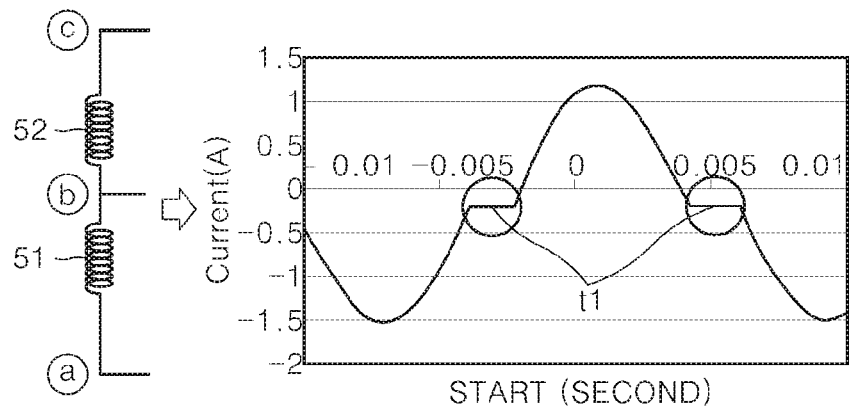

As described above, in the inverter 100 in which the number of groups is increased and the motor 200 in which the number of coils is increased, groups 110, 120, 130, 140, and 150 of the inverter 100 may correspond to coils 210, 220, and 230, but is not limited thereto. The number of groups 110, 120, 130, 140, and 150 of the inverter 100 may be greater than the number of coils 210, 220, and 230 of the motor. In this case, as shown in FIG. 2, the switch 40 may be further used to switch the mode.

While the present disclosure has been described with reference to exemplary drawings thereof, it is to be understood that the present disclosure is not limited to implementations and drawings in the present disclosure, and various changes can be made by the skilled person in the art within the scope of the technical idea of the present disclosure. Although working effects obtained based on configurations of the present disclosure are not explicitly described while describing the implementations of the present disclosure, effects predictable based on the configurations have also to be recognized.

What is claimed is:

1. An operation controlling apparatus of a reciprocating compressor, the reciprocating compressor being configured to operate based on changes in load, the operation controlling apparatus comprising:
a detector configured to detect a torque output by a motor of the reciprocating compressor, a rotation speed of the motor, a counter electromotive voltage of the motor, and a current applied to the motor;
a controller configured to:
determine a mode switching time point for switching an operation mode of the reciprocating compressor based on the torque, the rotation speed, the counter electromotive voltage, and the current of the motor, and
output a control signal for changing a wire ratio of the motor corresponding to the operation mode based on the mode switching time point; and
a driver configured to change the wire ratio of the motor based on the control signal and operate the reciprocating compressor in the operation mode among at least two operation modes,
wherein the operation mode of the reciprocating compressor comprises a power saving mode corresponding to a first wire ratio, a power mode corresponding to a second wire ratio, and a normal mode corresponding to a third wire ratio,
wherein the second wire ratio is less than the first wire ratio, and
wherein the third wire ratio is less than the first wire ratio and greater than the second wire ratio.

2. The operation controlling apparatus of claim 1, wherein the driver comprises the motor and an inverter, the inverter comprising a full-bridge type inverter that comprises three or more groups of devices, and
wherein the motor comprises a wire-separated motor comprising two or more coils connected to each other electrically in series.

3. The operation controlling apparatus of claim 2, wherein each of the groups of devices corresponds to one of the coils of the motor.

4. The operation controlling apparatus of claim 2, wherein a number of the groups of devices is greater than a number of the coils of the motor, and
wherein the driver further comprises a switch configured to switch the operation mode based on the mode switching time point.

5. The operation controlling apparatus of claim 2, wherein the inverter comprises at least six full-bridge type switching devices and at least six free-wheel diodes, each of the full-bridge type switching devices being connected to one of the free-wheel diodes electrically in parallel.

6. The operation controlling apparatus of claim 5, wherein the full-bridge type switching devices comprise at least one of an insulated gate bipolar transistor (IGBT), a metal-oxide-semiconductor field effect transistor (MOSFET), or a bipolar junction transistor (BJT).

7. The operation controlling apparatus of claim 5, wherein the controller is configured to selectively turn on or turns off each of the full-bridge type switching devices based on a phase width modulation (PWM) control with the control signal.

8. The operation controlling apparatus of claim 5, wherein the coils of the motor comprise a first coil and a second coil that are adjacent to each other, and
wherein the groups of devices comprise:
a first group connected to an end of the first coil by a first current line;
a second group connected to an intermediate end between the first coil and the second coil by a second current line; and
a third group connected to an end of the second coil by a third current line.

9. The operation controlling apparatus of claim 8, wherein the controller is configured to:
control each of the full-bridge type switching devices to be turned on or turned off based on the control signal to thereby control current flow through the first coil, the second coil, or both; and
switch the operation mode of the reciprocating compressor based on the current flow through the first coil, the second coil, or both.

10. The operation controlling apparatus of claim 2, wherein the two or more coils have wire ratios that are different from one another.

11. The operation controlling apparatus of claim 1, wherein the controller is configured to change the wire ratio among the first wire ratio, the second wire ratio, and the third wire ratio based on the counter electromotive voltage of the motor.

12. The operation controlling apparatus of claim 11, wherein the controller is configured to:
in the power saving mode, control rotation of the motor based on the first wire ratio according to the counter electromotive voltage;
in the power mode, control rotation of the motor based on the second wire ratio that is less than 50% of the first wire ratio; and
in the normal mode, control rotation of the motor based on the third wire ratio that is between 50% of the first wire ratio and 100% of the first wire ratio.

13. The operation controlling apparatus of claim 11, wherein a rotation speed of motor in the power mode is greater than a rotation speed of the motor in the power saving mode, and
wherein a rotation speed of the motor in the normal mode is greater than the rotation speed of the motor in the power saving mode and less than the rotation speed of the motor in the power mode.

14. The operation controlling apparatus of claim 13, wherein the second wire ratio is reduced from the first wire ratio to rotate the motor with the rotation speed of the motor in the power mode.

15. The operation controlling apparatus of claim 11, wherein the driver is connected to a direct current (DC)-link and receive a DC-link voltage from the DC-link,
wherein the counter electromotive voltage is proportional to the rotation speed of the motor corresponding to a number of turns of the motor,
wherein the counter electromotive voltage has a speed limit voltage corresponding to a limit number of turns of the motor in each of the power saving mode, the power mode, and the normal mode, and
wherein the speed limit voltage is less than or equal to the DC-link voltage.

16. The operation controlling apparatus of claim 15, wherein the controller is configured to:
in each of the power saving mode, the power mode, and the normal mode, detect (i) the limit number of turns of the motor based on a same torque and (ii) a time point at which the counter electromotive voltage and the current are changed; and
determine the mode switching time point based on the time point at which the counter electromotive voltage and current are changed.

17. A method for controlling a reciprocating compressor, the reciprocating compressor being configured to operate based on changes in load, the method comprising:
detecting torque output by a motor of the reciprocating compressor, a rotation speed of the motor, a counter electromotive voltage of the motor, and a current applied to the motor;
determining a mode switching time point for switching an operation mode of the reciprocating compressor based on the torque, the rotation speed, the counter electromotive voltage, and the current of the motor;
outputting a control signal for changing a wire ratio of the motor corresponding to the operation mode; and
changing the wire ratio of the motor based on the control signal to thereby operate the reciprocating compressor in the operation mode among at least two operation modes,
wherein the operation mode of the reciprocating compressor comprises a power saving mode corresponding to a first wire ratio, a power mode corresponding to a second wire ratio, and a normal mode corresponding to a third wire ratio,
wherein the second wire ratio is less than the first wire ratio, and
wherein the third wire ratio is less than the first wire ratio and greater than the second wire ratio.

18. The method of claim 17,
wherein changing the wire ratio comprises changing the wire ratio among the first wire ratio, the second wire ratio, and the third wire ratio based on the counter electromotive voltage of the motor.

19. The method of claim 17, further comprising:
operating a driver to change the wire ratio among the first wire ratio, the second wire ratio, and the third wire ratio based on the control signal.

* * * * *